_United States Patent_ [19]

Otsuka

[11] Patent Number: 4,624,709

[45] Date of Patent: Nov. 25, 1986

[54] NIGROSINE DYES AND PROCESS FOR PREPARING SAME

[75] Inventor: Masahiro Otsuka, Osaka, Japan

[73] Assignee: Orient Chemical Industrie, Japan

[21] Appl. No.: 540,646

[22] Filed: Oct. 11, 1983

[30] Foreign Application Priority Data

Oct. 13, 1982 [JP] Japan ................................. 57-180430

[51] Int. Cl.$^4$ ..................... C07D 241/46; C09B 57/00; C09D 11/04; C09D 11/00
[52] U.S. Cl. .......................................... 106/22; 8/649; 430/106; 544/348
[58] Field of Search .......................... 544/348; 106/22; 430/106

[56] References Cited

U.S. PATENT DOCUMENTS 3,887,560 6/1975 Nagashima et al. ................. 544/348
4,056,530 11/1977 Maekawa ............................ 544/348
4,359,577 11/1982 Granzow et al. .................... 544/348
4,376,859 3/1983 Maurer et al. ....................... 544/348

FOREIGN PATENT DOCUMENTS 7665 of 1896 United Kingdom ................. 544/348

OTHER PUBLICATIONS

Pentel Co., Ltd., Chem. Ab., 99, 24222u (1982).
Color Index, 3rd edition, p. 4456.

_Primary Examiner_—Mark L. Berch
_Attorney, Agent, or Firm_—McGlew and Tuttle

[57] ABSTRACT

A novel substituted nigrosine dye represented by the formula $D(R)_n$ wherein D is a nigrosine dye residue, R is $C_3$–$C_{18}$ alkyl or alkenyl which may be straight or branched, or aralkyl or aralkenyl which may have a $C_1$–$C_8$ alkyl substituent on the aryl moiety, the R in each case being the same as or different from the others, and n is a number of 1 to 4. The novel nigrosine dye is prepared by reacting a corresponding unsubstituted nigrosine dye with an alkyl halide, alkenyl halide, aralkyl halide, or aralkenyl halide, or with a mixture thereof, to form the substituted nigrosine dye. The novel dye has a high solubility in and compatability with organic solvents and/or resins and is oleophilic and stable and particularly useful for ink compositions and as a charge control agent for the toners of electrophotographic or electrostatic image developers.

19 Claims, No Drawings

NIGROSINE DYES AND PROCESS FOR PREPARING SAME

FIELD AND BACKGROUND OF THE INVENTION

The present invention relates to nigrosine dyes having high solubility in or compatibility with organic solvents and/or resins and to a process for preparing the same.

Nigrosine dyes (C.I. Solvent Black 5, C.I. Solvent Black 7 and C.I. Solvent Blue 7) are soluble in organic solvents and useful for coloring synthetic resins, printing inks, inks for marking pens and ball-point pens, jet printing inks, stamp inks, etc. These dyes also find characteristic use in inks for infrared absorption reading because of their infrared absorption characteristics, and furthermore as charge control agents for electrophotographic, or electrostatic image, developer toners due to their electrostatic characteristics.

Nigrosine dyes commercially produced at present and used generally include spirit-soluble dyes such as hydrochloride and lower fatty acid salts of nigrosine, and oil-soluble dyes such as alkali-treated nigrosine base and higher fatty acid salts of nigrosine base. However, these dyes are not fully or completely soluble in generally contemplated solvents for various uses, so that improvements have been made therein to overcome this drawback.

For example, for such purpose, it is known to subject a nigrosine and a fatty acid to reaction in an aniline solution (Published Examined Japanese Patent Application No. 28792/1965); to react a nigrosine with oleic acid fluoride in a dioxane solution in the presence of triethylamine (Published Examined Japanese Patent Application No. 7800/1971); to produce a long-chain alkyl-containing nigrosine with the use of a long-chain alkyl-substituted aniline or long-chain alkyl-substituted nitrobenzene in place of the aniline or nitrobenzene for the corresponding preparation of nigrosine (Published Examined Japanese Patent Application No. 3185/1966); to couple a diazonium salt with a nigrosine (Published Unexamined Japanese Patent Application No. 13831/1976); to prepare a sulfonamide derivative of a nigrosine (Publsihed Examined Japanese Patent Application No. 50773/1972); and to obtain an amine salt of nigrosinesulfonic acid (U.S. Pat. No. 2,990,405).

However, these processes and the resulting products still remain to be improved because it is difficult to remove remaining unreacted starting materials from the reaction mixture, or because the product is not fully soluble in organic solvents or compatible with resins for various desired uses.

Furthermore, conventional nigrosine dyes have the inherent drawback that inks prepared with use of the particular dye become viscous with the lapse of time. While the active hydrogen of the amino portion of the nigrosine undergoes condensation with an organic acid to give an acid amide derivative which is less likely to become viscous with the lapse of time, this derivative is still insufficient and unsatisfactory in stability when allowed to stand as formulated into an ink.

SUMMARY OF THE INVENTION

In connection with intensive research which has been carried out to overcome all the various drawbacks of conventional nigrosine dyes and to provide with ease novel nigrosine dyes having a high purity, including research investigations into N-alkylated products, N-alkenylated products, N-aralkylated products, and N-aralkenylated products, of nigrosine dyes, and directing attention to the fact that alkyl, alkenyl, aralkyl, and aralkenyl substituents are oleophilic in nature and also to the fact that N-alkyl substituents, N-alkenyl substituents, N-aralkyl substituents, and N-aralkenyl substituents, are stable, it has been found in accordance with the present invention that novel nigrosine dyes and a corresponding process for their preparation may now be advantageously provided, which involve such oleophilic and stable substituents.

Accordingly, it is among the objects and advantages of the present invention to overcome the above noted drawbacks and deficiencies of the pertinent prior art, and to provide a novel nigrosine dye and a corresponding process for the preparation thereof in simple and efficient manner and in high yields, and readily recoverable in high purity, and especially such a novel nigrosine dye containing at least one oleophilic hydrocarbon substituted thereon, and possessing improved solubility and compatability with organic solvents and resins, especially toner resins as used for developing electrophotographic, or electrostatic, images and improved stability in organic solvent solutions with the lapse of time.

It is among the additional objects and advantages of the present invention to provide a novel nigrosine dye of the foregoing type usable for providing various ink compositions, usable as a charge control agent for providing compositions of toners of electrophotographic, or electrostatic image, developers, usable for coating pigment particles for providing pigment compositions, and usable for providing high concentration dyeing solutions for solvent dyeing of various materials such as fabric dyeing.

Other and further objects and advantages of the present invention will become apparent from a study of the within specification and accompanying examples.

The various features of novelty which characterize the invention are pointed out with particularity in the claims annexed to and forming a part of this disclosure. For a better understanding of the invention, its operating advantages and specific objects obtained by its uses and inherent features, reference is made to the accompanying descriptive matter in which preferred embodiments of the invention are illustrated.

DESCRIPTION OF THE PREFERRED EMBODIMENTS

Significant features of the present invention will now be described in detail.

Briefly, the present invention provides a novel nigrosine dye represented by the formula $$D\text{-}(R)_n \qquad (I)$$

wherein D is a nigrosine dye residue or radical, R is $C_3$-$C_{18}$ alkyl or alkenyl which in each case may be straight or branched, or aralkyl or aralkenyl which in each case may have an optional nuclear substituent such as a $C_1$-$C_8$ alkyl substituent, each R being the same as or different from the others, and n is a number from 1 to 4.

The present invention further provides a process for preparing a nigrosine dye represented by the formula (I) above, which process is characterized by reacting a corresponding precursor active hydrogen atom containing nigrosine dye of the conventional type with an alkyl halide, alkenyl halide, aralkyl halide, or aralkenyl halide, or with a mixture thereof, as alkylating agent.

Inherently, the precursor active hydrogen atom containing nigrosine dye used as starting material is not a single compound which can be specified distinctly but it appears to be many kinds of mixtures containing the following components, as the artisan will appreciate. (The Chemistry of Synthetic Dyes and Pigments, 1955, p 243):

(A) Reddish components

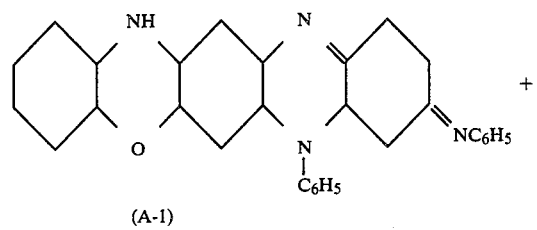

(A-1)

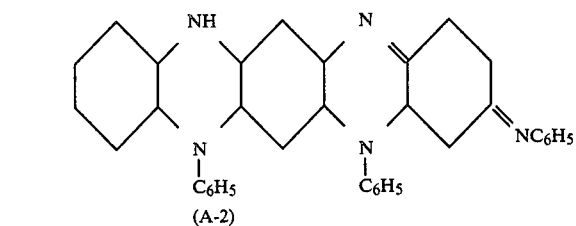

(A-2)

(B) Bluish components

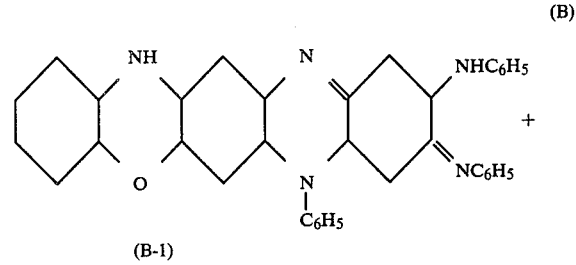

(B-1)

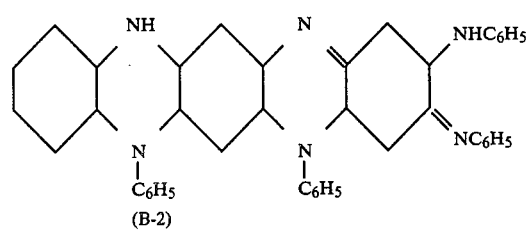

(B-2)

The following structures are specified for the corresponding precursor induline dyes or components analgous to the above precursor nigrosine dyes or components, and which may also be used (The Chemistry of Dyes and Pigments, 1955, p 242):

(C) Induline components

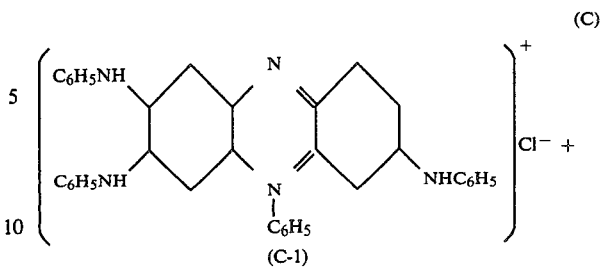

(C-1)

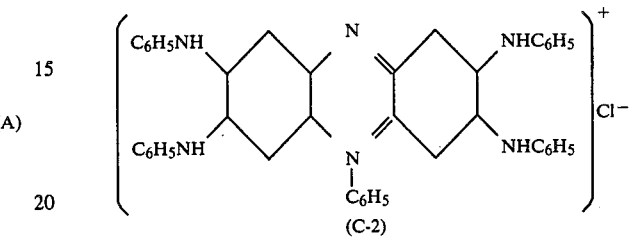

(C-2)

In any case, the precursor nigrosine dye contemplated herein appears to be a mixture of many pigments or constituents which may differ according to the production conditions, and it appears certain that the precursor dye in any case has at least one active hydrogen atom in the molecule, e.g. attached to a nitrogen atom thereof.

All such precursor nigrosine dyes and induline dyes as contemplated herein may therefore be conveniently termed herein individually or collectively as a precursor active hydrogen atom containing nigrosine dye, e.g. a precursor nigrosine dye having at least one amino group containing at least one substitutable active hydrogen atom thereon (per Formulas (B) and (C) above) or a precursor nigrosine dye having at least one ring nitrogen atom therein, i.e. a nuclear or heterocyclic N atom, containing a substitutable active hydrogen atom thereon (per Formulas (A) and (B) above.

Accordingly, by way of the present invention, a novel hydrocarbon radical substituted nigrosine dye of the above formula (I) may be obtained by reacting the corresponding active hydrogen atom attached to the amino substituent or ring nitrogen atom of a nigrosine dye of the contemplated type with an alkyl halide, alkenyl halide, aralkyl halide, or aralkenyl halide, or with a mixture thereof, as the case may be. The hydrocarbon substituted dye so obtained, although of the base type, is surprisingly satisfactorily soluble in organic solvents when singly used, unlike nigrosine base which is used conjointly with an organic acid or the like to achieve acceptable solubility. The instant dye also advantageously exhibits good compatibility with resins.

The foregoing production reaction of the present invention may be carried out in versatile manner by dissolving nigrosine base in a solvent and adding an alkyl halide, alkenyl halide, aralkyl halide, or aralkenyl halide, or a mixture of such halides, as the case may be, dropwise to the resulting solution in the presence of an alkali agent or acid binding agent, i.e. halogen binding agent. The desired novel reaction product of the present invention is conveniently obtained by removing the formed alkali halide salts from the reaction mixture, as by filtration, and then removing the solvent for recovery of the instant dye.

Examples of solvents useful for the above reaction are those which are capable of dissolving nigrosine base effectively, such as dioxane, dimethylformamide, dimethyl sulfoxide, dimethylaniline, dimethylbenzylamine and nitrobenzene.

The reaction may be conducted advantageously at a temperature ranging between about room temperature and the boiling point of the particular solvent. It is desirable to maintain the reaction mixture at a temperature below the solvent boiling point during the dropwise addition of the halide or halides, and thereafter to elevate the temperature to a desired specified level to promote the reaction.

The reaction time, which is understandably shorter at a higher reaction temperature, is generally between about 2 to 10 hours, i.e. after the dropwise addition of the halide or halides.

Examples of alkali agents or acid binding agents useful for the reaction are alkali metal and alkaline earth metal compounds, especially bases or hydroxides and carbonates, such as potassium hydroxide, sodium hydroxide, lithium hydroxide, potassium carbonate, sodium carbonate, lithium carbonate, those calcium carbonate, etc. Since those compounds which are usable in a dispersed or undissolved solid state are more convenient, the corresponding carbonates are most suitable for use as the alkali agents or acid binding agents.

The number of moles of the contemplated alkyl halide, alkenyl halide, aralkyl halide, or aralkenyl halide, to be reacted with the precursor active hydrogen atom containing nigrosine dye according to the process of the present invention is 1 to 4 in corresponding relation to the amount of the alkylating agent being used and is limited of course by the number of active hydrogen atoms in the starting dye. The number of moles is selectable therefore within the range of 1 to 4, and, like n which is an average number on a mole basis, need not be a whole number.

In this regard, a dye product having higher solubility is obtained by reacting a larger relative number of moles of a halide having a higher molecular weight, but the resulting color value is lower by an amount corresponding to the increase in molecular weight afforded by the reaction, i.e. the oleophilic hydrocarbon radical substitution or alkylation, so that it is desired to use halides in a suitable combination in respect of their molecular weight, mole number and proportion in order to assure the selective attaining of the desired solubility or the like in the produced product.

Examples of halides useful for producing the dye product of the present invention are the usual hydrocarbon halides; i.e. alkyl, alkenyl, aralkyl and/or aralkenyl halides, such as n-propyl bromide, allyl bromide, n-butyl chloride, n-butyl bromide, isobutyl bromide, 2-ethylhexyl bromide, n-octyl bromide, n-octyl chloride, benzyl chloride, benzyl bromide, β-phenylethyl bromide, β-phenylethyl chloride, p-methylbenzyl chloride, p-ethylbenzyl chloride, cinnamyl chloride, p-octylbenzyl chloride, dodecyl bromide, cetyl bromide, oleyl chloride (i.e. 9,10-octadecenyl chloride), stearyl bromide (i.e. octadecyl bromide), etc.

According to the process of the invention, the desired product is obtained by removing the attendant alkali halide salts from the reaction mixture, for example, by filtration and thereafter recovering the solvent from the filtrate. The salts are removable by any usual method. For the removal of the solvent, the reaction mixture may be diluted with water to cause the reaction product, which is generally water insoluble, to precipitate, and the precipitate may then be filtered off.

Although the product can be obtained by vacuum distillation, this method generally fails to remove the solvent effectively and to give the desired product in acceptably high purity. It is difficult to use a spray dryer to recover the product since the solvent as contemplated generally has a relatively high boiling point.

Most suitably, the reaction product can be separated from such a high boiling solvent with use of a flash vacuum dryer (Published Examined Japanese Utility Model Application No. 16161/1981), such as one which comprises an elongated heating tube having a length-/diameter ratio of at least 300 and having one end open to a vacuum evaporating chamber and the other end arranged for introducing the solution thereinto at a constant rate, and a steam or non-condensable gas generator connected via a flow regulator to the heating tube for introducing steam or a non-condensable gas to the tube simultaneously with the supply of the solution. Such dryer gives the reaction product in high purity and with reduced attendant solvent and like contents by way of a continuous single process.

The dye product prepared by the present process is recovered in the form of particles or readily crushable pumice-like gravel when it has a high melting point, or in the form of a flowable liquid when hot if it has a low melting point. The process has the advantage that the product is easy to handle and can be obtained in a very high yield, and generally in essentially dry particle condition, with the solvent being recovered with a high efficiency.

The novel nigrosine dye obtained by way of the present invention is of course outstanding in solubility and in stability with the lapse of time, e.g. in the usual organic solvents used for forming dye solutions. The solution thereof (ink) is highly amenable to filtration, such that it passes through a 1-μ membrane filter. With improved compatibility with resins, the instant dye is particularly useful as a charge control agent to give a stable toner with enhanced uniformity. Furthermore, pigments chargeable to the desired amount and having high affinity for resins can be prepared easily with the use of a solution of the novel dye by coating particles of carbon black or like pigment with the solution. When dyeing fishing nets or the like type fabric material with a solution of the dye in a solvent, the solution can be prepared with a high dye concentration, so that dyed products can be obtained with a higher degree of blackness than conventional products. Thus, the instant dye is highly useful and for various purposes.

Incidentally, the novel nigrosine dye of the above formula (I) can be prepared also by reacting a precursor nigrosine dye with an olefin, but this process has the drawback of necessitating a complex procedure for separating the catalyst used and of being considerably costly.

The present invention will be described more specifically with reference to the following examples, which are set forth by way of illustration and not limitation and in which the parts are all by weight unless otherwise specifically indicated.

EXAMPLE 1

(Single Type R Substitutent)

A 150 part quantity (0.25 mole) of Nigrosine Base EX (brand name, C.I. Solvent Black 7 (C.I. 50415:1), product of Orient Chemical Industries, Ltd., average molecular weight about 600) was dissolved in 1500 parts of dimethylformamide in a four-necked 2-liter round-bottomed flask equipped with a stirrer, dropping funnel, reflux condenser and thermometer. Then 140 parts (1.0 mole) of anhydrous potassium carbonate (i.e. containing 2.0 moles or gram atoms of potassium) was dispersed in the resulting solution, and the mixture was maintained at 80° C.

Thereafter, n-octyl bromide (97 parts or 0.5 mole, n=2 per formula I above) was added dropwise to the mixture over a period of 2 hours. The reaction mixture was first stirred at the same temperature of 80° C. for 1 hour, then stirred at an elevated temperature of 120° C. for the next 2 hours, and thereafter allowed to cool.

The resulting mixture was filtered, and the filtrate was treated in a flash vacuum dryer (trademark "Crux," product of Oriental Chemical Industries Ltd.) in a vacuum of 50 torr at a rate of 45 ml/min, with the evaporating chamber set to a temperature of about 150° C. The flash vacuum dryer treatment required 40 minutes and gave 198 parts of readily crushable gravel-like small pieces or particles. The weight loss of this product on drying was 0.67%. The dried product was dissolved in benzene-methanol (1:1) and checked for λ max, which was found to be 570 nm, i.e the same as that of the starting material. The concentration of the product was 74.5% based on the starting material, i.e. Nigrosine Base EX.

EXAMPLES 2 TO 7

(Single Type R Substituent)

The same reaction as in Example 1 was repeated under the same conditions with the exception of using different halides as noted below and appropriate molar amounts of the alkali agent. The resulting filtrates were treated similarly to obtain the corresponding reaction products. Table 1 shows the results (the value (n) corresponding to that of Formula (I) above).

TABLE I

| Example | Halide Name | Parts (n) | Yield (parts) | Appearance | Conc. (%) |
|---|---|---|---|---|---|
| 2 | n-Butyl bromide | 103 (3) | 101 | Powdery | 80.3 |
| 3 | n-Dodecyl bromide | 125 (2) | 227 | Gravel-like when cooled | 65.2 |
| 4 | Oleyl chloride* | 144 (2) | 247 | Tarry | 58.8 |
| 5 | Benzyl chloride | 32 (1) | 164 | Powdery | 87.1 |
| 6 | Benzyl chloride | 80 (2.5) | 200 | Powdery to gravel-like | 74.5 |
| 7 | β-Phenylethyl bromide | 93 (2) | 192 | Powdery to gravel-like | 75.6 |

*9,10-octadecenylchloride, $CH_3(CH_2)_7CH=CH(CH_2)_7CH_2-Cl$

EXAMPLE 8

(Mixed R Substituents)

The same Nigrosine solution as in Example 1 having anhydrous potassium carbonate dispersed therein was prepared. To this solution was added dropwise n-dodecyl bromide (62.5 parts or 0.25 mole, n=1 per Formula (I) above) over a period of 1 hour at 80° C. After stirring the mixture at this same temperature for 1 hour, 77 parts (0.625 mole, n=2.5 per Formula I above) of n-propyl bromide was added dropwise thereto over a period of 1 hour. The reaction mixture was thereafter heated slowly to 120° C., at which temperature the mixture was then stirred for 2 hours. The mixture was thereafter allowed to cool. The resulting reaction mixture was then subjected to the same after-treatment as in Example 1, giving 212 parts of readily crushable gravel-like product, which had a concentration of 70.8% based on the starting material, i.e., Nigrosine Base EX.

EXAMPLES 9 TO 13

(Mixed R Substituents)

The reaction and aftertreatment of Example 8 were repeated under the same conditions as in Example 8 except that the halides were replaced by different alkyl, alkenyl and aralkyl halides in admixture to obtain the corresponding products as listed in Table 2.

TABLE 2

| Example | Halide Name | Parts (n) | Yield (parts) | Appearance | Conc. (%) |
|---|---|---|---|---|---|
| 9 | Benzyl Chloride | 47.5 (1.5) | 203 | Gravel-like when cooled | 69.1 |
|   | 2-Ethylhexyl bromide | 49 (1.0) | | | |
| 10 | Benzyl chloride | 32 (1) | 195 | Powdery to gravel-like | 73.8 |
|   | n-Butyl bromide | 86 (2.5) | | | |
| 11 | n-Dodecyl bromide | 62.5 (1) | 213 | Gravel-like when cooled | 68.1 |
|   | n-Octyl Bromide | 49 (1) | | | |
| 12 | Oleyl chloride* | 72 (1) | 229 | Gravel-like when cooled | 63.2 |
|   | n-Butyl Bromide | 51.5 (1.5) | | | |
| 13 | Oleyl chloride* | 72 (1) | 273 | Tarry | 54.2 |
|   | Stearyl bromide** | 83.5 (1) | | | |

*9,10-octadecenyl chloride, $CH_3(CH_2)_7CH=CH(CH_2)_7CH_2Cl$
**n-octadecyl bromide, $CH_3(CH_2)_{16}CH_2Br$

EXAMPLE 14

(Single Type R Substituent)

The procedure of Example 1 was repeated except that Nigrosine Base EX was replaced by 132.5 parts (0.25 mole) of Fine Black MF (brand name, Induline Base, Base Type of C.I. Solvent Blue, 7 product of Orient Chemical Industries Ltd., average molecular weight about 530), whereby 192 g of a tarry product was obtained.

The product was dissolved in benzene-methanol (1:1) and checked for λ max, which was 525 nm, whereas the value for the starting material, i.e., Fine Black MF, was 545 nm. The concentration at λ max was 68% based on the starting material.

EXAMPLE 15

(Marking Pen Ink)

A marking pen ink was prepared with the use of the dye obtained in Example 1 and xylene and butanol as solvents according to the formulation given in Table 3. For comparison, a conventional marking pen ink was prepared according to the formulation listed in Table 3 as Comparison Example 1 (C.Ex.1). The two inks were tested for stability with the lapse of time. Table 4 shows the results.

The ink containing the dye of Example 1 had a low viscosity and good stability, whereas the dye used in Comparison Example 1 was not soluble to give an ink unless oleic acid was used in admixture therewith and even so exhibited poor stability after a 6 month lapse of time because of the formation of a precipitate therein.

TABLE 3

|  | Example 15 (parts) | Comparison Example 1 (parts) |
|---|---|---|
| Dye of Example 1 | 15 | — |
| Nigrosine Base EX | — | 10 |
| Xylene | 57 | 57 |
| n-Butanol | 8 | 8 |
| Butyl cellosolve | 5 | 5 |
| Resin | 15 | 15 |
| Oleic acid | — | 5 |

TABLE 4
(Stability with lapse of time)

| Temp. | Property | Example | 0* | 1 | 2 | 3 | 6 |
|---|---|---|---|---|---|---|---|
| 50° C. | Solubility | Ex. 15 | A | A | A | A | A |
|  |  | C. Ex. 1 | A | A | A | A | B |
|  | Viscosity | Ex. 15 | 3.5 | 3.5 | 3.5 | 3.6 | 4.0 |
|  | (cp, 20° C.) | C. Ex. 1 | 4.2 | 5.5 | 6.0 | 6.5 | 7.0 |
| 5° C. | Solubility | Ex. 15 | A | A | A | A | A |
|  |  | C. Ex. 1 | A | A | A | A | C |

*Immediately after preparation.
A: Good
B: A precipitate started to appear.
C: A precipitate or deposit was observed.

EXAMPLE 16
(Marking Pen Ink)

A marking pen ink was prepared with the use of the dye obtained in Example 4 and ethylcyclohexane as the main solvent according to the formulation listed in Table 5 below. When the ink was tested for stability at 5° C., no dye or the like separated out even after the lapse of 3 months, hence demonstrating good stability.

For comparison, an attempt was made to prepare an ink similarly with the use of Nigrosine Base EX, but the dye was insoluble, failing to afford an ink.

Further, when it was attempted to prepare an ink similarly with the use of a higher fatty acid salt of Nigrosine Base (Oil Black BY manufactured by Orient Chemical Industries, Ltd. and containing 35% of a higher fatty acid), the dye did not dissolve effectively, again failing to form an ink.

Further, an ink was prepared in the same manner as in the above comparison case except that the ethylcyclohexane was partly replaced by nonylphenol, according to the formulation listed in Table 5 as Comparison Example 2. The markings produced with this comparison ink were sticky and unsatisfactory.

TABLE 5

|  | Example 16 (parts) | Comparison Example 2 (parts) |
|---|---|---|
| Dye of Example 4 | 15 | — |
| Oil Black BY | — | 12 |
| Ethylcyclohexane | 65 | 59 |
| n-Butanol | 5 | 5 |
| Butyl cellosolve | 4 | 4 |
| Resin | 11 | 11 |
| P—Nonylphenol | — | 9 |

EXAMPLE 17
(Ball-Point Pen Ink)

A ball-point ink was prepared with the use of the dye obtained in Example 6 and phenyl glycol as the main solvent according to the formulation listed in Table 6 below.

For comparison, an attempt was made to prepare an ink similarly with the use of Nigrosine Base EX, but the dye was not effectively soluble, failing to give an ink.

Further an ink was prepared in the same manner as above except that the solvent was partly replaced by oleic acid, according to the formulation listed in Table 6 as Comparison Example 3 (C.Ex.3). However, the comparison ink containing a large quantity of oleic acid was not only more viscous but was also corrosive to the brass tip and undesireable.

The inks were tested for stability with the lapse of time with the results given in Table 7.

TABLE 6

|  | Example 17 (parts) | Comparison Example 3 (parts) |
|---|---|---|
| Dye of Example 6 | 35 | — |
| Nigrosine Base | — | 27 |
| Solvent[a] | 45 | 38 |
| Resin | 15 | 15 |
| Lubricant[b] | 5 | 5 |
| Oleic acid | — | 15 |

[a]A mixture of phenyl glycol (4 parts) and benzyl alcohol (1 part).
[b]A mixture of cationic active agent (3 parts) and oleic acid (2 parts).

TABLE 7
(Stability with lapse of time)

| Temp. | Property | Example | 0* | 1 | 2 | 3 | 6 |
|---|---|---|---|---|---|---|---|
| 50° C. | Solubility | Ex. 17 | A | A | A | A | A |
|  |  | C. Ex. 3 | A | A | A | A | A |
|  | Viscosity | Ex. 17 | 8,000 | 8,000 | 8,200 | 8,500 | 9,000 |
|  | (cp. 20° C.) | C. Ex. 3 | 12,000 | 12,500 | 13,000 | 13,500 | 15,000 |
| 5° C. | Solubility | Ex. 17 | A | A | A | A | A |
|  |  | C. Ex. 3 | A | A | A | A | A |

*Immediately after preparation.
A: Good.

EXAMPLE 18
(Dye Solubility)

Table 8 below shows the solubilities of some of the foregoing dyes in a solvent mixture of phenyl glycol (4 parts) and benzyl alcohol (1 part) at room temperature.

When formulated into an ink for ball-point pens, Nigrosine Base is almost limited to the concentration of Comparison Example 3, whereas the products of the present invention are higher in solubility and give inks of higher concentration and higher stability by compensating for the reduction in concentration due to an increase in molecular weight.

TABLE 8

| Dye | Solubility (g/100 ml) |
| --- | --- |
| Nigrosine Base EX | 25 |
| Dye of Example 1 | 60 |
| Dye of Example 4 | At least 120 |
| Dye of Example 6 | 50 |
| Dye of Example 8 | 65 |
| Dye of Example 9 | 60 |

EXAMPLE 19

(Electrostatic Developer)

One hundred parts of a styrene resin (Piccolastic D-125, manufactured by Esso Petrochemical Co.) as toner resin, 5 parts of carbon black (RAVEN 150, manufactured by Columbian Carbon Co., Inc.) as coatable pigment particles, and 5 parts of the compound of Example 6 serving as a charge control agent, were uniformly premixed in a ball mill to obtain a premix, which was then kneaded in a molten state with hot rolls, cooled, then coarsely crushed, finely pulverized and screened, to obtain a toner sample 5 to 15μ in particle size containing the foregoing ingredients in intimately intermixed condition.

Next, another toner was prepared exactly in the same manner as in the above example with the exception of using 5 parts of Nigrosine Base EX in place of the compound of Example 6 by way of comparison example (Comparison Example 4).

Five parts of each of these toners were admixed with 95 parts of finely divided iron carrier particles to obtain an electrostatic developer.

The developer was used for developing by the magnetic brush process electrostatic images formed on a photoconductive plate composed of a resin and zinc oxide dispersed therein. The toner images were transferred onto paper and then heated for fixing the images on the paper.

The copy images obtained with the use of the developer incorporating the toner sample of the present invention example were found to be superior to those obtained with the use of the developer containing the toner of the comparison example (Comparison Example 4), in freedom from fogging and in distinctness or sharpness.

The developers were further repeatedly used for making copy images. With the developer containing the toner of the comparison example (Comparison Example 4), the carrier became contaminated, giving obscure images after only about 10,000 copying cycles, and the developer became no longer usable. On the other hands with the developer incorporating the toner of the present invention example, the carrier remained almost free of contamination, with the result that the developer produced sharp images even after about 20,000 copying cycles (i.e. twice the number for Comparison Example 4), with little or no change found in quality between these images and those initially produced.

Furthermore, minus 100-mesh particles of the novel nigrosine dyes prepared in Examples 1, 3, 6 and 9 were tested for triboelectric chargeability, with the results shown in Table 9. The amount of triboelectric charge was measured by the blowoff method (which is described in detail in Yamaguchi et al "Denshi Shashin (Electrophotography, 16, (2) 52–58 (1977)].

TABLE 9

| Dye | Amount of charges ($\mu c/g$) |
| --- | --- |
| Nigrosine Base EX | 20.3 |
| Dye of Example 1 | 23.2 |
| Dye of Example 3 | 18.1 |
| Dye of Example 6 | 24.7 |
| Dye of Example 9 | 19.9 |

Tables 8 and 9 reveal that the novel dyes of the present invention prepared in accordance with the foregoing examples are outstanding in compatibility with resins and are usable in place of conventional charge control agents and give homogeneous toners of excellent properties.

EXAMPLE 20

(Dyeing Solution)

The dyes of Examples 1, 4, 6, 8 and 9 are each dissolved in a solvent mixture of phenyl glycol and benzyl alcohol in accordance with the procedure of Example 18 to form in each case a dyeing solution of high dye concentration. Each corresponding solution is used to dye fishnets to obtain a higher degree of blackness than conventional products.

EXAMPLE 21

(Pigment Coating Solution)

The dyes of Examples 1, 4, 6, 8 and 9 are each dissolved in a solvent mixture of phenyl glycol and benzyl alcohol in accordance with the procedure of Example 18 to form in each case a dyeing solution of sufficient concentration for coating carbon black pigment particles. Each corresponding solution is used to coat carbon black pigment particles of the same type as used in Example 19 by admixing the solution therewith. The coated pigment particles are chargeable to the desired amount and have a high affinity for toner resins.

Thus, in accordance with the broad aspects of the present invention, a nigrosine dye is provided which is represented by the formula (I), i.e. $D\text{-}(R)_n$, wherein D is a nigrosine dye moiety or residue, n is a number from 1 to 4, and each R is a hydrocarbon radical individually selected from the group consisting of alkyl of 3 to 18 carbon atoms, alkenyl of 3 to 18 carbon atoms, aralkyl which is optionally ring substituted with an alkyl substituent of 1 to 8 carbon atoms, and aralkenyl which is optionally ring substituted with an alkyl substituent of 1 to 8 carbon atoms.

Thus, each R may be the same or different alkyl such as n-propyl, isopropyl, n-butyl, isobutyl, sec.-butyl, tert.-butyl, n-pentyl, n-hexyl, n-heptyl, 2-ethylhexyl, n-octyl, n-nonyl, n-decyl, n-undecyl, n-dodecyl, n-tridecyl, n-tetradecyl, n-pentadecyl, n-hexadecyl(i.e.cetyl), n-heptadecyl, and n-octadecyl (i.e. stearyl), and the corresponding branched chain or isomeric forms of said normal or straight chain pentyl to octadecyl radicals in addition to said 2-ethylhexyl.

Each R may also be the same or different alkenyl such as α-, β- and γ-allyl (i.e. allyl, propenyl and isopropenyl), butenyl, pentenyl, hexenyl, heptenyl, octenyl, nonenyl, decenyl, undecenyl, dodecenyl, tridecenyl, tetradecenyl, pentadecenyl, hexadecenyl (i.e. cetenyl), heptadecenyl, and octadecenyl (e.g. oleyl), including the corresponding normal or straight chain as well as the branched chain isomeric forms thereof, and whereing the ethylenic unsaturation or double bond location is situated at any point along the alkenyl chain.

Each R may further the same or different aralkyl such as phenyl or naphthyl substituted -methyl, -ethyl, -propyl, -butyl, -pentyl, -hexyl, -heptyl, -octyl, and the like, including both the straight chain or normal and branched chain or isomeric forms of the corresponding alkyl moieties, and those in which the corresponding aryl moiety is optionally substituted with an alkyl substituent such as methyl, ethyl, and propyl to octyl as enumerated above, including both the straight chain or normal and branched chain or isomeric forms of the corresponding propyl to octyl radicals, e.g. phenylmethyl (i.e. benzyl), 2-phenylethyl (i.e. $\beta$-phenylethyl), p-methylbenzyl, p-ethylbenzyl, p-octylbenzyl, and the like; and more specifically aralkyl containing 6 to 10 nuclear carbon atoms in the corresponding aryl moiety thereof and 1 to 8, and especially 1 to 4, and more especially 1 to 2, carbon atoms in the corresponding straight or branched chain alkyl moiety thereof, and which is optionally substituted on the corresponding aryl moiety thereof with a straight or branched chain alkyl substituent of 1 to 8, and especially 1 to 4, and more especially 1 to 2, carbon atoms; and particularly phenyl alkyl containing 1 to 8, and especially 1 to 4, and more especially 1 to 2, carbon atoms in the corresponding straight or branched chain alkyl moiety thereof, and which is optionally substituted on the corresponding phenyl moiety thereof with a straight or branched chain alkyl substituent of 1 to 8, and especially 1 to 4, and more especially 1 to 2, carbon atoms.

Each R may still further be the same or different aralkenyl such as phenyl or naphthyl substituted -ethenyl (i.e. vinyl), -propenyl (i.e. allyl), -butenyl, -pentenyl, -hexenyl, -heptenyl, -octenyl, and the like, including both the straight chain or normal and branched chain or isomeric forms of the corresponding alkenyl moieties, and wherein the ethylenic unsaturation or double bond location is situated at any point along the alkenyl chain, and those in which the corresponding aryl moiety is optionally substituted with an alkyl substituting such as methyl, ethyl, and propyl to octyl as enumerated previously above, including both the straight chain or normal and branched chain or isomeric forms of the corresponding propyl to octyl radicals, e.g. phenylallyl (i.e. 3-phenylprop-2-en-1-yl or cinnamyl) and the like; and more specifically aralkenyl containing 6 to 10 nuclear carbon atoms in the corresponding aryl moiety thereof and 2 to 8, and especially 2 to 4, carbon atoms in the corresponding straight or branched chain alkenyl moiety thereof, and which is optionally substituted on the corresponding aryl moiety thereof with a straight or branched chain alkyl substituent of 1 to 8, and especially 1 to 4, and more especially 1 to 2, carbon atoms; and particularly phenylalkenyl containing 2 to 8, and especially 2 to 4, carbon atoms in the corresponding straight or branched alkenyl moiety thereof, and which is optionally substituted on the corresponding phenyl moiety thereof with a straight or branched chain alkyl substituent of 1 to 8, and especially 1 to 4, and more especially 1 to 2, carbon atoms.

Where n is more than 1 in said formula (I) above, according to one feature of the present invention each R is alkyl, and one R is different from at least one other R; according to another such feature one R is alkyl, another R is alkenyl, and any remaining R is either alkyl or alkenyl as the case may be; and according to still another such feature one R is alkyl, another R is aralkyl, and any remaining R is either alkyl or aralkyl as the case may be.

In accordance with one embodiment of the present invention, each R is individually selected from the group consisting of alkyl of 3 to 18 carbon atoms, alkenyl of 3 to 18 carbon atoms, and aralkyl containing 6 to 10 nuclear carbon atoms in the corresponding aryl moiety thereof and 1 to 8 carbon atoms in the corresponding alkyl moiety thereof, and which is optionally substituted on the corresponding aryl moiety thereof with an alkyl substituent of 1 to 8 carbon atoms.

Preferably, each R is individually selected from the group consisting of straight and branched chain alkyl of 3 to 18 carbon atoms, straight and branched chain alkenyl of 3 to 18 carbon atoms, and phenylalkyl containing 1 to 8 carbon atoms in the corresponding alkyl moiety thereof, and which is optionally substituted on the corresponding phenyl moiety thereof with an alkyl substituent of 1 to 8 carbon atoms.

In particular, the nigrosine dye represented by formula (I) above, and in which said D, n and R therein are as defined previously hereinabove, in essence constitutes the reaction product prepared by reacting a precursor nigrosine dye of the conventional type containing at least one active hydrogen atom correspondingly attached to a nitrogen atom in the precursor dye, e.g. attached to the nitrogen atom of an amino group substituent on the precursor dye molecule, or attached to a nuclear or heterocyclic N atom in the precursor dye molecule, or attached to both types of nitrogen atoms where at least two active hydrogen atoms are present in the precursor dye molecule, and represented by the corresponding precursor nigrosine dye formula D$\pm$H)$_n$ wherein D and n are the same as defined previously above, and each H is a replaceable hydrogen atom correspondingly attached to a nitrogen atom in the precursor dye, with at least one corresponding hydrocarbon halide represented by the formula RX wherein R is the same as defined previously hereinabove and X is a halogen atom, such as chlorine, bromine, fluorine and iodine, in an organic solvent as reaction medium and in the presence of an acid binding agent or alkali agent, such as alkali metal or alkaline earth metal hydroxide or carbonate.

The corresponding hydrocarbon halides of the formula RX above contemplate as R radicals all those previously enumerated hereinabove for forming the corresponding (R)$_n$ substituted nigrosine dye of the present invention, and will be used in appropriate mixture, as where n is more than 1, for forming mixed alkyl and/or alkenyl and/or aralkyl and/or aralkenyl (R)$_n$ substituted dyes of the instant type, including as the case may be those containing the same or different alkyl, the same or different alkenyl, the same or different aralkyl, or the same or different aralkenyl, or corresponding mixed alkyl, alkenyl, aralkyl and/or aralkenyl, (R)$_n$ substituted dyes of the instant type. Conveniently, the produced product is recovered by filtration from the resulting insoluble components in the reaction mixture, e.g. alkali metal halide or alkaline earth metal halide salts formed in the process, followed by solvent removal from the resulting filtrate, e.g. by adding water to the resulting or original filtrate to precipitate the produced product therefrom and then filtering off the precipitate, by vacuum distilling of the solvent from the original filtrate, by spray drying the original filtrate, or more preferably by subjecting the original filtrate to flash vacuum drying, whereby to provide a final product generally in the form of substantially or essentially dry crushable solid particles.

It will be appreciated that by way of the present invention the precursor active hydrogen atom containing nigrosine dye is specifically and selectively modified according to the nature of the R radical or radicals added thereon in place of the pertinent active hydrogen atom at the particular attachment nitrogen atom site or location in the precursor nigrosine dye molecule, and that the oleophilic hydrocarbon nature of such R radical or radicals results in an enhancement of the properties of the final produced product, dye especially as regards marked improvement in the solubility of the instant dye in, and conjoint compatibility with, any contemplated organic solvent, and concordently marked improvement in the stability of the resulting solution with the lapse of time, as compared with conventional nigrosine dyes, i.e. corresponding to such precursor nigrosine dyes, and their solutions in organic solvents and concordant stability.

Thus, the instant dye may be provided in the form of an ink composition containing a solvent for said dye.

The hydrocarbon radical modified nigrosine dyes of the present invention also advantageously possess improved compatibility with resins, e.g. toner resins for producing electrostatic images, and in particular may be used as a charge control agent to provide a stable and homogeneous toner of enhanced uniformity, e.g. as to its electrical charge properties.

Thus, the instant dye may also be provided in the form of a toner composition containing a toner resin, e.g. of any suitable conventional type in finely divided form, for developing electrostatic images, in admixture with said dye, with said dye being present in a charge control effective amount for suitably controlling the charge of the toner resin.

A finely divided carrier, e.g. finely divided iron carrier particles of the conventional type, may be advantageously admixed with such toner composition to provide a developer for developing electrostatic images. Also, a coloring agent, e.g. of the conventional pigment type such as carbon black or the like, may be similarly admixed with such toner composition.

Hence, the instant dye may be provided in the form of a toner composition containing such a toner resin for developing electrostatic images in finely divided intimately intermixed form, with said dye being present in a charge control effective amount for controlling the charge of the toner resin, and also containing such a coloring agent and such a finely divided carrier to provide a developer for developing electrostatic images.

The instant dye is also capable of effectively coating pigment particles such as carbon black, which have a high affinity for resins such as toner resins of the above contemplated type, when said dye is dissolved in a suitable organic solvent of the conventional type and the dye solution applied to the pigment particles to coat the same.

Thus, the instant dye may additionally be provided in the form of a pigment composition containing pigment particles, such as carbon black or the like, coated with said dye.

The instant dye is also capable of effectively dyeing fabric material such as fishing nets or the like, i.e. material which is subjected inherently to prolonged contact with fresh and/or salt water, when said dye is dissolved in a suitable organic solvent of the conventional type in high dye concentration, whereupon the so dyed material products can be obtained with a higher degree of blackness than when using conventional dye products.

Thus, the instant dye may further be provided in the form of a fabric dyeing composition containing a solvent for said dye for forming a solvent dyeing solution thereof of high dye concentration.

It should be noted that the instant pigment coating solution and resulting composition, such as is contemplated in Example 21, may be used in the same way as disclosed in U.S. Pat. No. 3,749,670 (Ormsbee et al) for those liquid developer compositions which contain the nigrosine dye Nigrosine Base B or Nigrosine Base SSB (C.I. 50415).

In particular, the precursor nigrosine dye according to the present invention, i.e. corresponding to D in formula (I) herein, may be a nigrosine base dye such as Nigrosine Base B or Nigrosine Base SSB (C.I. 50415) as disclosed in said U.S. Pat. No. 3,749,690, as well as C.I. Solvent Black 7 (C.C.I. 50415:1), C.I. Solvent Blue 7, or the like, as earlier noted, all of which have at least one replaceable active hydrogen atom available for reaction with the corresponding halide or alkylating agent as contemplated herein.

While various specific embodiments of the invention have been shown and described in detail to illustrate the application of the principles and inherent features of the invention, it will be understood that the invention may be embodied otherwise without departing from such principles and inherent features.

What is claimed is:

1. A nigrosine dye represented by the formula D$\text{-}(\text{R})_n$ wherein D is a nigrosine dye moiety of the water insoluble nigrosine base C.I. 50415:1 (C.I. Solvent Black 7), n is a number from 1 to 4, and each R is a hydrocarbon radical individually selected from the group consisting of alkyl of 3 to 18 carbon atoms, alkenyl of 3 to 18 carbon atoms, aralkyl which is optionally ring substituted with an alkyl substituent of 1 to 8 carbon atoms, and aralkenyl which is optionally ring substituted with an alkyl substituent of 1 to 8 carbon atoms, said dye being recoverable in the form of crushable solid particles of high purity and having storage stability, solubility in organic solvents and compatibility with organic solvents and toner resins, said storage stability constituting stability against precipitation separation of said dye from an organic solvent solution thereof with the lapse of time.

2. Dye of claim 1, wherein each R is alkyl.

3. Dye of claim 1, wherein each R is alkenyl.

4. Dye of claim 1, wherein each R is aralkyl.

5. Dye of claim 1, wherein n is more than 1, each R is alkyl, and one R is different from at least one other R.

6. Dye of claim 1, wherein n is more than 1, one R is alkyl, another R is alkenyl, and any remaining R is alkyl or alkenyl.

7. Dye of claim 1, wherein n is more than 1, one R is alkyl, another R is aralkyl, and any remaining R is alkyl or aralkyl.

8. Dye of claim 1, wherein each R is individually selected from the group consisting of alkyl of 3 to 18 carbon atoms, alkenyl of 3 to 18 carbon atoms, and aralkyl containing 6 to 10 nuclear carbon atoms in the corresponding aryl moiety thereof and 1 to 8 carbon atoms in the corresponding alkyl moiety thereof, and which is optionally substituted on the corresponding aryl moiety thereof with an alkyl substituent of 1 to 8 carbon atoms.

9. Dye of claim 1, wherein each R is individually selected from the group consisting of straight and branched chain alkyl of 3 to 18 carbon atoms, straight and branched chain alkenyl of 3 to 18 carbon atoms, and phenylalkyl containing 1 to 8 carbon atoms in the corresponding alkyl moiety thereof, and which is optionally substituted on the corresponding phenyl moiety thereof with an alkyl substituent of 1 to 8 carbon atoms.

10. Dye of claim 1, in the form of an ink composition containing a solvent for said dye.

11. Dye of claim 1, in the form of a toner composition containing a toner resin for developing electrostatic images in admixture therewith, said dye being present in a charge control effective amount for controlling the charge of the toner resin.

12. Dye composition of claim 11, wherein a finely divided carrier is admixed therewith to provide a developer for developing electrostatic images.

13. Dye composition of claim 11, wherein a coloring agent is admixed therewith.

14. Dye composition of claim 11, in finely divided intemately intermixed form, and containing a coloring agent and a finely divided carrier to provide a developer for developing electrostatic images.

15. Dye of claim 1 in the form of a pigment composition containing pigment particles coated with said dye.

16. Dye of claim 1 in the form of a fabric dyeing composition containing a solvent for said dye for forming a solvent dyeing solution thereof of high dye concentration.

17. A nigrosine dye represented by the formula D—(R)$_n$ wherein D is a nigrosine dye moiety of the water insoluble nigrosine base C.I. 50415:1 (C.I. Solvent Black 7), n is a number from 1 to 4, and each R is a hydrocarbon radical individually selected from the group consisting of alkyl of 3 to 8 carbon atoms, alkenyl of 3 to 18 carbon atoms, aralkyl which is optionally ring substituted with an alkyl substituent of 1 to 8 carbon atoms, and aralkenyl which is optionally ring substituted with an alkyl substituent of 1 to 8 carbon atoms, and which constitutes the reaction product prepared by reacting a precursor nigrosine dye constituted by the water insoluble nigrosine base C.I. 50415:1 (C.I. Solvent Black 7) and containing at least one active hydrogen atom correspondingly attached to at least one nitrogen atom in the precursor dye and represented by the formula D—(H)$_n$ wherein D and n are the same as defined above, and each H is a replaceable hydrogen atom correspondingly attached to a nitrogen atom in the precursor dye, with at least one corresponding hydrocarbon halide represented by the formula RX wherein R is the same as defined above and X is a halogen atom, in an organic solvent in the presence of an acid binding agent selected from the group consisting of alkali metal compounds and alkaline earth metal compounds, said reaction product dye being recoverable in the form of crushable solid particles of high purity and having storage stability, solubility in organic solvents and compatibility with organic solvents and toner resins, said storage stability constituting stability against precipitation separation of said reaction product dye from an organic solvent solution thereof with the lapse of time.

18. A process for preparing a nigrosine dye represented by the formula D—(R)$_n$ wherein D is a nigrosine dye moiety of the water insoluble nigrosine base C.I. 50415:1 (C.I. Solvent Black 7), n is a number from 1 to 4, and each R is a hydrocarbon radical individually selected from the group consisting of alkyl of 3 to 18 carbon atoms, alkenyl of 3 to 18 carbon atoms, aralkyl which is optionally ring substituted with an alkyl substituent of 1 to 8 carbon atoms, and aralkenyl which is optionally ring substituted with an alkyl substituent of 1 to 8 carbon atoms, which comprises reaction a precursor nigrosine dye constituted by the water insoluble nigrosine base C.I. 50415:1 (C.I. Solvent Black 7) and containing at least one active hydrogen atom correspondingly attached to at least one nitrogen atom in the precursor dye and represented by the formula D—(H)$_n$ wherein D and n are the same as defined above, and each H is a replaceable hydrogen atom correspondingly attached to a nitrogen atom in the precursor dye, with at least one corresponding hydrocarbon halide represented by the formula RX wherein R is the same as defined above and X is a halogen atom, in an organic solvent in the presence of an acid-binding agent selected from the group consisting of alkali metal compounds and alkaline earth metal compounds, and recovering as produced product the corresponding dye represented by said formula D—R)$_n$ from the resulting reaction mixture, in the form of crushable solid particles of high purity and having storage stability, solubility in organic solvents and compatibility with organic solvents and toner resins, said storage stability constituting stability against precipitation separation of said produced product dye from an organic solvent solution thereof with the lapse of time.

19. Process of claim 18, wherein the produced product is recovered by filtration from the resulting insoluble components in the reaction mixture, followed by solvent removal from the resulting filtrate to provide such final product in the form of crushable solid particles.

* * * * *